Jan. 13, 1959  A. LASCH  2,868,517
APPARATUS FOR THE CONTINUOUS MIXING OF MATERIALS
Filed Nov. 26, 1956  2 Sheets-Sheet 1

INVENTOR.
Albert Lasch
BY Michael S. Striker
agt.

Jan. 13, 1959 A. LASCH 2,868,517
APPARATUS FOR THE CONTINUOUS MIXING OF MATERIALS
Filed Nov. 26, 1956 2 Sheets-Sheet 2

INVENTOR.
Albert Lasch
BY Michael S. Striker
agt.

United States Patent Office 2,868,517
Patented Jan. 13, 1959

2,868,517
APPARATUS FOR THE CONTINUOUS MIXING OF MATERIALS

Albert Lasch, Stuttgart-Bad Cannstatt, Germany, assignor to Werner & Pfleiderer, Stuttgart-Feuerbach, Germany Application November 26, 1956, Serial No. 624,275

Claims priority, application Germany November 24, 1955

4 Claims. (Cl. 259—6)

The present invention relates to an apparatus for mixing of materials, and more specifically to an apparatus for mixing of rubber or plastic materials in a continuous process.

The production of homogeneous material mixtures meets with considerable difficulties, especially if the components of the mixtures differ from each other considerably in specific weight or if plastic materials have to be mixed with powdered materials of small specific weight and oily liquids. According to the prior art trough mixing machines have been used for mixing such components, but in such machines the mixing process could not be performed in a continuous manner, because in such machines the temperature of the mixture rises during the mixing process, so that the quality of the mixture is impaired. In machines according to the prior art, it was therefore necessary to remove the partly mixed components from the machine, to let the materials cool whenever this partly finished mixture reached a maximum permissible temperature. This procedure of removing the partly finished mixture from the machine to let the components cool off has to be repeated often several times depending on the composition of the mixture and the temperature sensitivity of the components. In the production of rubber mixtures, it was also very difficult to add sulphur at the beginning of the mixing process, because the danger always existed that a vulcanization would take place which would render the rubber mixture not usable. It was, therefore, necessary to add the sulphur subsequently by working it into the mixture in special rolling mills, which procedure is of course time-consuming and therefore expensive.

Various attempts have been made to develop machines for the continuous production of rubber and plastic mixtures, but these attempts have so far not been successful. A decisive disadvantage of the machines and methods according to the prior art has also been that plastic materials of great specific weight as, for instance, rubber are more extensively engaged by the mixing tools of the machine and are therefore conveyed through the machine ahead of powdery materials of lesser specific weight, as, for instance, carbon black, so that such components could never be perfectly mixed in the machine to homogenous mixture.

It is one object of the present invention to avoid the above-mentioned drawbacks of machines according to the prior art.

It is a further object of the present invention to provide for an apparatus for mixing of materials in a continuous process and in a single apparatus.

It is an additional object of the present invention to provide for an apparatus for the continuous mixing of components having greatly varying physical characteristics in a continuous process.

It is yet another object of the present invention to provide for such an apparatus which is composed of relatively few and rugged parts which will perform trouble-free over long time periods.

With these objects in view, the apparatus according to the present invention essentially performs the steps of successively premixing and prekneading batches of the materials in a first stage for combining the materials together; intermittently feeding the thus-premixed and prekneaded batches to a second stage, and finish mixing and kneading the thus-fed batches in the second stage to an extent providing a homogeneous combination of the materials while continuously discharging the thus-produced homogeneous combination from the second stage.

Preferably the materials are treated in the first and in the second stage of the process in thin layers and the materials are preferably cooled during the mixing and kneading thereof in the first as well as in the second stage to avoid undue temperature rise of the components during the mixing process.

The apparatus of the present invention preferably comprises a housing including a first chamber formed with an inlet, a second chamber formed with an outlet, and passage means located between and communicating at opposite ends thereof respectively with the first and the second chamber, first mixing and kneading means located in the first chamber for premixing the materials, closure means located in the passage means for intermittently closing the passage means, the closure means being movable between a closed position in which the closure means closes the passage means and an open position in which the closure means opens the passage means, and second mixing and kneading means located in the second chamber for finish mixing the materials and for feeding the mixture from the passage means to the outlet.

The mixing and kneading means of the apparatus are preferably formed by two pairs of screws respectively arranged in the first and second chamber of the housing and these screws have respectively outer surfaces spaced a small distance from the inner surface of the chambers in which the screws are arranged so that the materials are mixed and kneaded in a thin layer between the outer surfaces of the screws and the inner surfaces of the respective chamber.

Preferably operating means are also provided which are connected to the closure means for automatically moving the closure means from the closed position thereof to the open position and back in timed intervals or in dependence of the amount of material accumulating on top of the second mixing and kneading means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
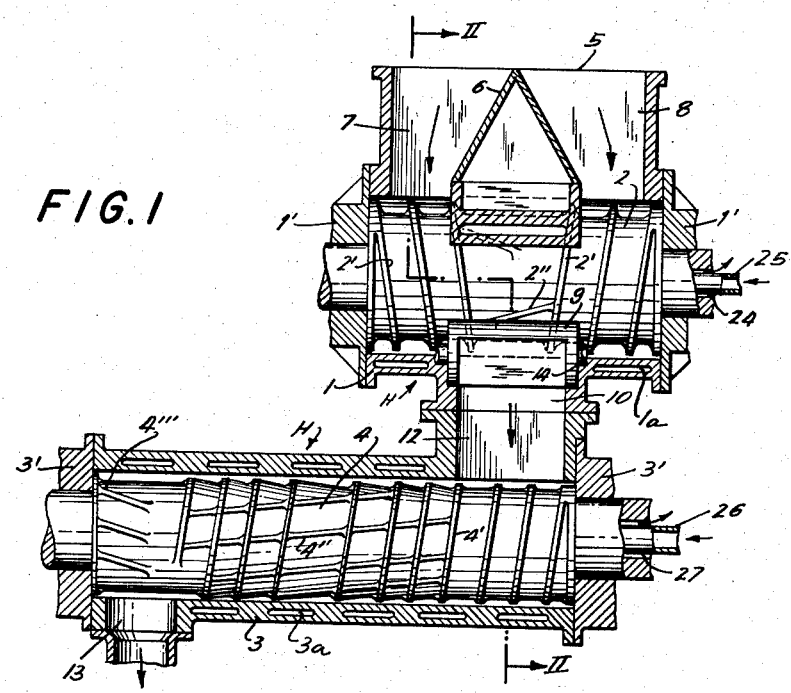
Fig. 1 is a sectional view of the apparatus according to the present invention, the section being taken substantially along the line I—I of Fig. 2, viewed in the direction of the arrow.
Figure 2:
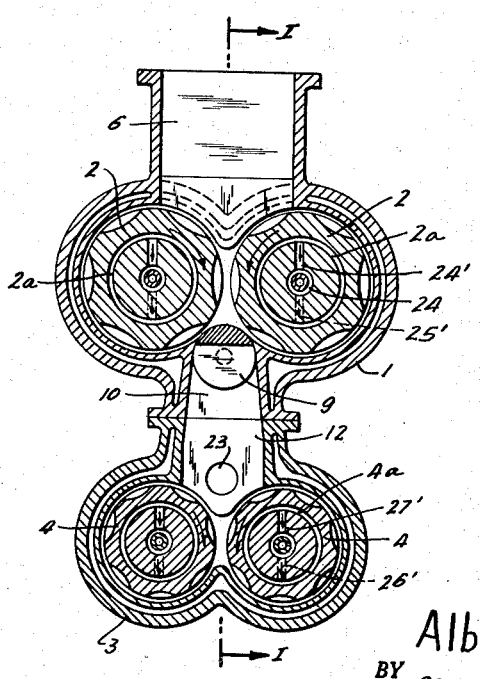
Fig. 2 is a sectional view of the apparatus, the section being taken along the line II—II of Fig. 1, viewed in the direction of the arrow.
Figure 3:
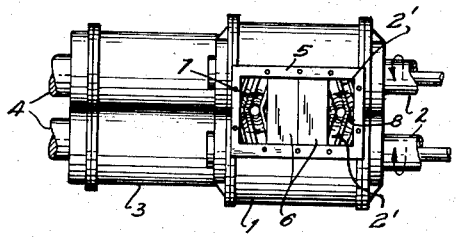
Fig. 3 is a top view of the apparatus according to the present invention, this figure being drawn to a smaller scale than Fig. 1 and 2.

Referring now to the drawings, and more particularly to Figs. 1–3 of the same, it will be seen that the apparatus according to the present invention comprises a housing H including a first chamber 1 formed with an inlet 5 and a second chamber 3 formed with an outlet 13. The first chamber 1 is shorter than the second chamber 3 and is located above and adjacent one end of the second chamber 3 and passage means 10, 12 are provided between the first chamber 1 and the second chamber 3. The passage means 10, 12 communicate at one end thereof with the first chamber 1 at a location between the opposite ends thereof and with the second chamber 3 at one end thereof opposite to the end on which the outlet 13 is located.

The housing H is preferably formed in two parts and the upper part thereof comprises the first or upper chamber 1 including inlet 5 and the upper portion of passage means 10 which are preferably integrally formed with each other as shown in Fig. 2. The lower part of the housing comprises the lower portion 12 of the passage means, the second or lower chamber 3 and the outlet 13 which are also integrally formed with each other. The lower end of the passage means 10 and the upper end of the passage means 12 are respectively formed with flanges, which are fastened together by screws, not shown in the drawing, or in any other convenient manner. The first or upper chamber 1 as well as the second chamber 3 are each formed by a pair of cylindrical wall portions which intersect as best shown in Fig. 2 and first mixing and kneading means in the form of a pair of screws 2 are arranged in the first chamber 1, whereas second mixing and kneading means in the form of a pair of screws 4 are arranged in the second chamber 3. The screws 2 are arranged next to each other and mounted for rotation in opposite direction as indicated by the arrows about parallel axes on end shields 1' fastened to and closing the opposite ends of the first chamber 1. In a similar way, the screws 4 are mounted next to each other for rotation in opposite direction about parallel axes on end shields 3' fastened to and closing the opposite ends of chamber 3. Screws 2 and 4 are driven by drive means such as for instance electric motors, not shown in the drawings, and the arrangement is preferably made in such a way that the speed of the screws 2 can be varied independent from the speed of screws 4. The inlet 5 is divided by centrally located baffle plates 6, inclined to each other to form a roof-like structure as best shown in Figs. 1 and 3, into two inlet passages 7 and 8 and the screws 2 are each provided in the region of the passages 7 and 8 with oppositely inclined helix portions 2' respectively leading from opposite ends of the screws 2 towards the center portions thereof. The center portion of each of the screws 2 is provided with short ribs 2" projecting from the base surface of the screw towards the inner surface of the chamber 1 in which the screws 2 are located. These ribs 2" are, as clearly shown in Fig. 1, arranged transversely to the helixes 2' and successive ribs are slightly inclined toward each other as shown in Fig. 1. As clearly shown in Figs. 1 and 2 the helixes 2' and the transverse ribs 2" are relatively short so that the cylindrical base surfaces of screws 2 are spaced only a small distance from the inner cylindrical surfaces of the first chamber 1. Each of the screws 4 located in the second chamber 3 is provided with a feed helix 4' leading from the end of the screw 4 located adjacent to passage 12 toward the outlet 13. Each of the screws 4 is also provided in the region between the passage 12 and the outlet 13 with a plurality of short kneading ribs 4" projecting, spaced from each other, from the base surface of the screw 4 in transverse direction to the helix 4' toward the inner surface of the second chamber 3. Additional kneading ribs 4''' are provided at the outlet of the screws 4 adjacent to outlet 13 and the ribs 4''' include an obtuse angle with the ribs 4". The helixes 4' as well as the ribs 4" and 4''' are also short so that the cylindrical base surface of screws 4 are spaced only a small distance from the inner cylindrical surfaces of the second chamber 3.

Fluid passage means 2a are respectively provided in each of the screws 2 in the form of a cylindrical or spiral channel formed adjacent to the outer surfaces of screws 2 as best shown in Fig. 2. Channels 2a extend respectively between opposite ends of screws 2 and are closed at these ends. Each of the shafts respectively supporting the screws 2 in the end shields 1' is formed on one side thereof with a central bore 24 into which a pipe 25 extends, the outer surface of the latter being spaced from the inner surface of the bore 24 as shown in Figs. 1 and 2. The inner end of each pipe 25 communicates through a cross channel 25' with one end of one channel 2a at one end thereof whereas the bore 24 communicates through the cross channel 24' with the other end of this channel 2a. Cooling fluid fed into the pipe 25 will therefore pass through the cross channel 25' into the fluid passage 2a on one end thereof and leaves the fluid passage 2a at the other end thereof through the space between the inner surface of the bore 24 and the outer surface of pipe 25 as indicated by the arrows in Fig. 1.

Each of the screws 4 are provided in the same way as described above with fluid passages 4a which can be supplied, respectively, with cooling fluids through a pipe 26 located in the bore 27 formed in the shaft of screws 4, and the screws 4 are each provided in the same way as screws 2 with cross channels 26' and 27' respectively communicating at opposite ends thereof with the channels 4a and the bores 27 and pipes 26.

The walls of the chambers 1 and 3 are also respectively provided with fluid passages 1a and 3a which are connected to fluid inlet and outlet pipes, not shown in the drawings, for circulating a cooling fluid through these fluid passages. It is understood that all of the fluid inlet pipes and all of the fluid outlet pipes are connected respectively to a cooling fluid reservoir, not shown in the drawings, from which cooling fluid can be recirculated through the fluid passage means by means of a standard pump, not shown in the drawings.

Located in the upper portion 10 of the passage means is a closure means 9 in the form of a rotary slide valve. This slide valve 9 is mounted for turning movement on a shaft 14 between a closed position, shown in Fig. 2, in which the slide valve 9 closes the passage means 10, 12 and an open position in which the slide valve 9 opens the passage means. The opening and closing of the slide valve 9 may be accomplished by hand, for instance, by means of a crank fixed to one end of shaft 14 outside the housing H.

Figure 4:
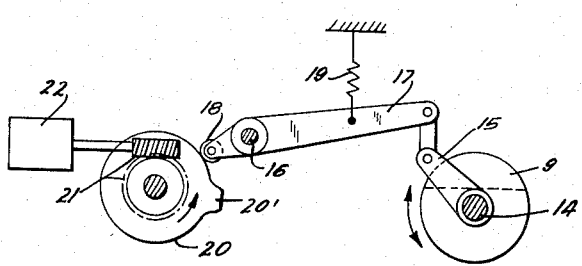
Fig. 4 is a digrammatic view of an operating mechanism for operating the closure means of the apparatus.

The opening and closing of the rotary slide valve 9 may also be accomplished fully automatically and an operating mechanism for automatically opening and closing the rotary slide valve 9 at timed predetermined intervals is diagrammatically illustrated in Fig. 4.

As shown in Fig. 4 a crank lever 15 is keyed or otherwise fixedly fastened to one end of the shaft 14 on which the rotary slide valve 9 is mounted for turning movement between the open and closed positions thereof. The outer end of the lever 15 is connected by a short link to one end of the longer arm of a double-armed lever 17 which is mounted for tilting movement on a pivot 16. Turnably mounted on the free end of the short arm of the lever 17 is a cam follower 18 which cooperates with a cam 20. A spring 19 fastened at one end to the long arm of the lever 17, intermediate the free end and the pivot 16 thereof, and at the other end to a portion of the housing H tends to keep the cam follower 18 in engagement with the cam 20 and to keep, at the same time, the rotary slide valve 9 in closed position. The cam 20 is provided with a substantially circular cam surface from which a cam portion 20' projects. Cam 20 is driven by a worm drive 21 which, in turn, is driven by an electric motor 22. Motor 22 is preferably provided with a standard means to regulate its speed so that the speed of the cam can be regulated as desired.

Figure 5:
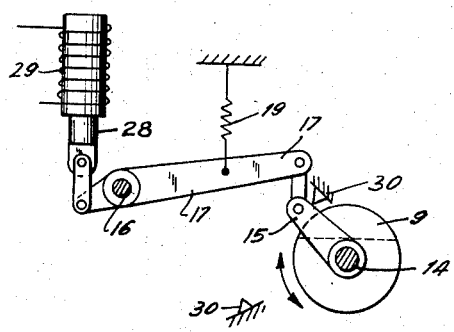
Fig. 5 is a diagrammatic view of another embodiment of such an operating mechanism.

Another operating mechanism for moving the rotary slide valve 9 between the closed and the open positions thereof is diagrammatically shown in Fig. 5. The lever 17 shown therein is not moved by a rotating cam, but the free end of the short arm of the lever is connected by means of a link to the armature 28 of solenoid 29. When the solenoid 29 is energized, the armature is attracted and the valve 9 is turned from its closed to its open position. Stops 30 fixed to the housing H are provided to limit the movement of the valve in both directions.

The lower part of the passage means 10, 12 is provided with an opening 23 closed by transparent material so that any accumulation of material on top of the screws 4 can be observed through this window 23.

An electric eye may be located in this window 23 and this electric eye may be operatively connected to the electromagnet 29 so that the electromagnet will be energized whenever the rays from the electric eye will not be obstructed by material located above the screws 4 in front of the window 23. A mechanical feeler engaging the material on top of screws 4 may also be provided and this feeler may be connected to switches to energize and deenergize the solenoid 29 in dependence on the amount of material located on top of screws 4.

The apparatus as described will operate as follows:

The materials to be mixed are fed in batches into the inlet 5 and will fall along the baffle plates 6 through the inlet channels 7 and 8 to opposite ends of the first chamber 1. The oppositely directed helixes 2' of the feed screws 2 will move these materials under pressure towards the central portion of the screws 2 in which the materials are engaged by the kneading ribs 2" extending in transverse direction between the inner ends of the helixes 2'. Thereby, the components of the mixture are premixed and prekneaded in a rapid manner and after a certain homogeneity of the mixture is reached the rotary slide valve 9 is turned from its closed position to its open position, so that the premixed materials pass through the passage means 10 and 12 to the second chamber 3 where this material accumulates in the lower portion 12 of the passage means on top of the screws 4. The material is now engaged by the feed helixes 4' of the screws 4 and transported from the lower part of the passage means 12 towards the outlet 13. During the passage of the material the same is engaged by the transverse kneading ribs 4" of the screws 4 and thoroughly finish-mixed and kneaded to a completely homogeneous mixture. In this second stage of the process the material is continuously fed towards the outlet 13 and thoroughly mixed and kneaded during this feeding process. Since the outer surfaces of screws 2 and 4 are respectively spaced only a small distance from the inner surfaces of the chambers 1 and 3 in which these screws are respectively located, the materials are mixed and kneaded in the first as well as in the second stage of the apparatus in thin layers. The temperature of the mixture can be closely controlled in the first and second stages of the apparatus by circulating cooling or heating fluids through the fluid passage means respectively provided in the walls of the first and second chambers and in the screws 2 and 4.

To assure that enough material is always provided in the passage means 10, 12 so that the mixing and kneading process in the second stage can be accomplished in a continuous process, the window 23 is provided in the lower portion 12 of the passage means and an operator may observe the amount of material located on top of the screws 4 through the window 23 and turn the rotary slide valve 9 from its closed position to its open position by hand whenever the material on top of the screws 4 drops to a predetermined minimum.

Instead of manually operating the rotary slide valve 9 the same may be automatically operated in timed intervals by one of the operating mechanisms as illustrated in Fig. 4 or Fig. 5. If the operating mechanism illustrated in Fig. 4 is used the speed of the motor 22 will be set at the beginning of the operation in such a way that the cam portion 20' of the cam 20 will engage the cam follower 18 to tilt the lever 17 in intervals timed according to the feed capacity of the screws 4 so that always enough material will be maintained on top of the screws 4 to maintain in the second stage a continuous process. It is also possible to provide on top of the inlet 5 a hopper and to provide between this hopper and the inlet 5 a rotary slide valve similar to the rotary slide valve 9 and to turn this rotary slide valve in sequence with the rotary slide valve 9 by a similar operating mechanism as shown in Fig. 4. For this purpose a second cam similar to cam 20 may be fixedly mounted on the shaft of the cam 20 and the slide valve located between the hopper and the inlet may be operated by this second cam in the same manner as the slide valve 9 is operated by the cam 20.

If the operating mechanism diagrammatically illustrated in Fig. 5 is used, the rotary slide valve 9 will be turned from its closed position shown in Fig. 2 to its open position whenever the material accumulating on top of the screws 4 will sink below the path of the rays of the electric eye located in the window 23. In this moment, the solenoid 29 will be energized and attract the armature 28 to tilt the lever 17 in clockwise direction and turn thereby the rotary slide valve 9 from its closed to its open position. The material will thereupon pass from the first chamber 1 into the second chamber 3 and accumulate in front of the window 23 to interrupt the path of the rays from the electric eye located therein so that the solenoid 29 will again become deenergized and the spring 19 will turn the lever 17 in counterclockwise direction to close the rotary slide valve 9 again. When the operating mechanism illustrated in Fig. 5 is used, the rotary slide valve 9 is therefore turned in dependence on the amount of material accumulating on top of the screws 4.

In this manner, the components fed in batches into the first chamber 1 are premixed and combined therein together and the thus premixed materials are intermittently fed into the second chamber 3 in which they are thoroughly kneaded and finish-mixed to a completely homogenous mixture in a continuous process. Since the outer surfaces of the mixing and kneading screws 2 in the first chamber 1 as well as the outer surfaces of the mixing and kneading screws 4 in the second chamber 3 are respectively spaced from the inner surfaces of the respective chambers only a small distance, the mixing and kneading of the components is performed in thin layers. By the provision of the fluid channels in the walls of the first chamber 1 and second chamber 3 and the provision of fluid channels in the screws 2 and 4 the temperature of the materials can be closely controlled during the whole mixing process so that any unfavorable temperature rising of the mixture can be definitely avoided.

It will be understood that each of the elements described above, or two or more together, may also find a useful application in other types of method and apparatus for mixing of materials differing from the types described above.

While the invention has been illustrated and described as embodied in a method and apparatus for mixing of rubber and plastic materials in a continuous process, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for continuously mixing at least two materials comprising, in combination, a housing including a first chamber formed with an inlet, a second chamber located below said first chamber and formed with an outlet, and passage means located between and communicating at opposite ends thereof respectively with said first and said second chambers; first mixing and kneading means located in said first chamber for premixing the materials; second mixing and kneading means located in said second chamber for finish mixing the materials and for feeding the mixture from said passage means to said outlet; closure means located in said passage means for intermittently closing said passage means, said closure means being movable between a closed position in which said closure means closes said passage means and an open position in which said closure means opens said passage means so that the materials premixed in said first chamber will pass through said passage means and accumulate in said second chamber on top of said second mixing and kneading means; and automatic operating means operatively connected to said closure means for moving said closure means from said closed position to said open position in dependence of the accumulation of the material in said second chamber on top of said second kneading means.

2. An apparatus for continuously mixing at least two materials comprising, in combination, a housing including a first chamber formed with an inlet, a second chamber located below said first chamber and formed with an outlet, and passage means located between and communicating at opposite ends thereof respectively with said first and said second chambers; first screw means located in said first chamber for premixing and kneading the materials, said first screw means having an outer surface spaced a small distance from the inner surface of said first chamber so that the materials are premixed and kneaded between said outer surface of said first screw means and said inner surface of said first chamber in a thin layer; second screw means located in said second chamber for finish mixing the materials and for feeding the mixture from said passage means to said outlet, said second screw means having an outer surface spaced a small distance from the inner surface of said second chamber so that the premixed materials are finish mixed and kneaded between said outer surface of said second screw means and said inner surface of said second chamber in a thin layer; closure means located in said passage means for intermittently closing said passage means, said closure means being movable between a closed position in which said closure means closes said passage means and an open position in which said closure means opens said passage means so that the materials premixed in said first chamber will pass through said passage means and accumulate in said second chamber on top of said second mixing and kneading means; and automatic operating means operatively connected to said closure means for moving said closure means from said closed position to said open position in dependence of the accumulation of the material in said second chamber on top of said second kneading means.

3. An apparatus for continuously mixing at least two materials comprising, in combination, a housing including a first chamber formed with an inlet, a second chamber located below said first chamber and formed with an outlet, and passage means located between and communicating at opposite ends thereof respectively with said first and said second chambers; first screw means located in said first chamber for premixing and kneading the materials, said first screw means having an outer surface spaced a small distance from the inner surface of said first chamber so that the materials are premixed and kneaded between said outer surface of said first screw means and said inner surface of said first chamber in a thin layer; second screw means located in said second chamber for finish mixing the materials and for feeding the mixture from said passage means to said outlet, said second screw means having an outer surface spaced a small distance from the inner surface of said second chamber so that the premixed materials are finish mixed and kneaded between said outer surface of said second screw means and said inner surface of said second chamber in a thin layer; fluid passage means provided in the walls of said housing and in said screw means for circulating cooling fluids thereto so that the materials may be cooled during the mixing thereof; closure means located in said passage means for intermittently closing said passage means, said closure means being movable between a closed position in which said closure means closes said passage means and an open position in which said closure means opens said passage means so that the materials premixed in said first chamber will pass through said passage means and accumulate in said second chamber on top of said second mixing and kneading means; and automatic operating means operatively connected to said closure means for moving said closure means from said closed position to said open position in dependence of the accumulation of the material in said second chamber on top of said second kneading means.

4. An apparatus for continuously mixing at least two materials comprising, in combination, a housing including a first chamber formed with a pair of inlets respectively arranged adjacent opposite ends of said first chamber, a second chamber formed with an outlet adjacent one end thereof, and passage means located between and communicating at opposite ends thereof respectively with said first chamber at a location located between the opposite ends thereof and with said second chamber at the other end thereof; a pair of first mixing and kneading screws located opposite and adjacent each other in said first chamber and being mounted for rotation in opposite direction about substantially parallel axes, said pair of first screws having an outer surface spaced a small distance from the inner surface of said first chamber so that the materials are premixed and kneaded between said outer surface of said pair of first screws and said inner surface of said first chamber in a thin layer, each of said first screws having a pair of oppositely directed helix portions located respectively in the region of said pair of inlets for feeding the materials from said inlets towards said passage means and a kneading portion located between said helix portions; a pair of second mixing and kneading screws located opposite and adjacent each other in said second chamber and being mounted for rotation in opposite direction about substantially parallel axes, said pair of second screws having an outer surface spaced a small distance from the inner surface of said second chamber so that the premixed materials are finish mixed and kneaded between said outer surface of said pair of second screws and the inner surface of said second chamber in a thin layer, each of said second screws being formed on the outer surface thereof with a helix extending from said passage means toward said outlet and having kneading ribs projecting from the outer surface thereof transverse to said helix; fluid passage means provided in the walls of said housing and in said screws for circulating cooling fluids thereto so that the materials may be cooled during the mixing thereof; closure means located in said passage means for intermittently closing said passage means, said closure means being movable between a closed position in which said closure means closes said passage means and an open position in which said closure means opens said passage means; and automatic operating means operatively connected to said closure means for intermittently moving said closure means from the closed position to the open position thereof and back in timed intervals, whereby when said closure means is in said open position the materials premixed in said first chamber passes through said passage means to said second chamber.

References Cited in the file of this patent

UNITED STATES PATENTS

| | | |
|---|---|---|
| 2,256,422 | Brayer | Sept. 16, 1941 |
| 2,524,999 | Schulerud | Oct. 10, 1950 |
| 2,543,307 | Swallow et al. | Feb. 27, 1951 |
| 2,710,744 | Hensler | June 14, 1955 |